G. R. Hay
Making Staves.
No 48,486. Patented June 27, 1865.
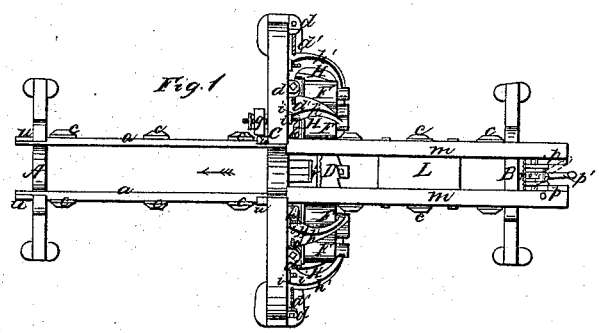
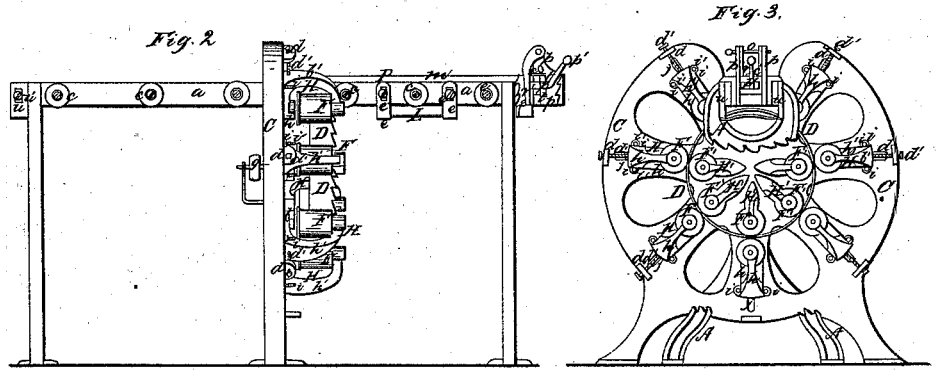
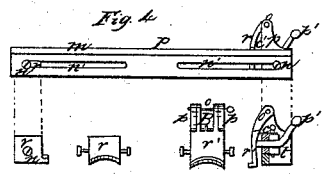 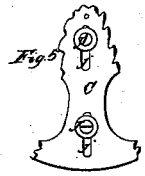
Witnesses
W. H. Burridge
A. W. McClelland
Inventor
Geo R Hay

UNITED STATES PATENT OFFICE.

GEORGE R. HAY, OF EDGERTON, OHIO, ASSIGNOR TO HIMSELF AND J. R. SEELY AND E. SEELY, OF SAME PLACE.

IMPROVEMENT IN STAVE-MACHINES.

Specification forming part of Letters Patent No. 48,486, dated June 27, 1865.

*To all whom it may concern:*

Be it known that I, GEORGE R. HAY, of Edgerton, in the county of Williams and State of Ohio, have invented certain new and useful Improvements in Stave-Machines; and I do hereby declare that the following is a full and complete description of the construction and operation of the same, reference being had to the accompanying drawings, making a part of this specification, in which—

Figure 1 is a plan view of the machine. Fig. 2 is a side elevation. Fig. 3 is an end elevation. Fig. 4 represents the carriage detached from the machine. Fig. 5 is a detached section of Fig. 3.

Similar letters of reference denote like parts in the different views.

My improvement relates to a machine for sawing staves, as hereinafter described.

A and B are standards or end pieces of the frame, that support ways $a\ a$ secured to them. Midway between these standards is an upright frame, C, formed as represented in Fig. 3, which is a front view with part of the standard A broken away.

D is a hoop-saw hung between friction-rollers F F' round the outside and inside of the saw on the front of the frame. The rollers are supported and turn in adjustable brackets H H'. The brackets H outside of the saw are formed of pieces $h$, that fit on the frame C, and are secured by screws J in the center, which pass through radiating slots $j$ in the frame C, by which the brackets, with the rollers, can be adjusted either way. At the outer end of this part of the brackets, on each side, are lugs $i$, in which there are set-screws $i'$, by means of which the brackets can be adjusted in a line parallel to the side of the saw. From this end of the brackets extend out around the rollers arms $h'$, as represented in the figures, in the ends of which the friction-rollers have their bearings at the outside ends, the inner ends being supported in the part $h$.

Around the frame C, opposite each bracket, is a lug, $d$, in which there is a set-screw, $d'$, that comes against the outside of the bracket or arm $h$, whereby the brackets are adjusted to suit the diameter of the saw, keeping it in its proper position, and being secured on the frame, as before stated, the brackets are held firmly and steadily in place, and are rendered adjustable either way by simply loosening the screws and moving the brackets as may be desired and then tightening the screws J and $d'$.

The inner brackets, H', are formed similar to the outside ones, only there are no set-screws connected with them, it not being necessary. They are secured on the frame by screws J, Fig. 3, in the center, passing through slots $j$ in the frame, so that they can, like the outside brackets, be adjusted either way. The object of having the brackets thus adjustable is that different-sized saws can be hung between the rollers for sawing staves for barrels of any size or diameter, and for adjusting the rollers on the saw, producing the required amount of tension to keep the saw in place, as above stated.

There are five friction-rollers, and there may be more or less around the inside of the saw, arranged, as represented, opposite the outside rollers, between which the saw is hung, and is thus retained steadily in its position.

The saw is revolved by a driving-pulley, $g$, on a shaft of one of the inside rollers, and it may be placed upon the shaft of any of the rollers.

The ways $a\ a$ are secured in the upper part of the frame C, as they are to the standards A and B, at the ends, by means of screws $u'$ in slotted pieces $u$, secured to the frame and standards. To the front end of the ways $a$ is hung an adjustable gage, L, by arms $e$, which, by means of the slots $e'$ and screws, can be raised or lowered more or less, as may be desired. On these ways rests and moves a carriage, P, that slides inside of the ways. The upper part, $m$, projecting over, rests and moves on friction-rollers $c$ on the outside of the ways, as shown in Figs. 1 and 2, by which the carriage is easily moved along.

At each end of the carriage there is a dog, $r$ and $r'$. The dog $r$ is secured to the sides of the carriage by screws $n$, whereby it can be adjusted longitudinally by means of slots $n'$, (seen in Fig. 4,) which is a side view of the carriage detached, the parts being shown in detail. The dog $r$ is pivoted at $o$ to standards $p$, secured to the sides of the carriage by screws $n$ in slots $n'$, similar to the dog at the other end, whereby the dogs can be adjusted to suit the length of the bolt or staves to be sawed.

$p'$ is a cam-lever that is pivoted in a slot in a cross-piece, $t$, between the standards $p$, that moves against the dog $r'$. When it is turned into the position indicated by the red lines in Fig. 1 the dog is drawn back by a spring, $c'$, attached to the cross-piece $t$ and dog, and by turning the lever round into the position shown the dog $r'$ is moved out and made to clamp against the bolt, when it is put in the carriage, holding it securely.

In sawing staves by this machine the bolt is placed in the carriage on the gage L and firmly held there by the dogs, as before described. The saw is set in motion and the carriage moved along on the rollers $c$, when a stave will be sawed off the under side of the bolt as it is moved from end to end over the saw in the direction of the arrow in Fig. 1. The carriage can then be moved back over the ways to its former position, when by turning the lever $p'$ the bolt is released and allowed to drop down on the gage, when the dog $r'$ is turned again against the bolt, and the bolt is ready for another stave to be sawed off. The curve of the staves will depend upon the size of the saw, being sawed more or less rounded, according to the size of the barrel for which they are designed to be used, and they can be sawed thick or thin by elevating or lowering the gage L by means of the slots and screws, and also by adjusting the ways $a$ up or down by the slotted pieces $u$, whereby the saw will take a deeper or thinner cut off the bolt.

What I claim as my improvement, and desire to secure by Letters Patent, is—

1. The arrangement of the adjustable brackets H H' with the adjusting-screws, rollers F F', and saw D, operating as and for the purpose set forth.

2. The carriage P, gage L, cam-lever $p'$, dogs $r$ $r'$, and springs $c'$, when arranged and operating as and for the purpose described.

GEO. R. HAY.

Witnesses:
W. H. BURRIDGE,
A. W. McCLELLAND.